(12) United States Patent
Isenhour et al.

(10) Patent No.: US 9,753,232 B2
(45) Date of Patent: Sep. 5, 2017

(54) FIBER ORGANIZER FOR RETAINING AND ROUTING OPTICAL FIBERS WITHIN FIBER OPTIC PLUG CONNECTORS, AND RELATED DEVICES, COMPONENTS, AND METHODS

(71) Applicant: CORNING OPTICAL COMMUNICATIONS LLC, Hickory, NC (US)

(72) Inventors: Micah Colen Isenhour, Lincolnton, NC (US); Christopher Paul Lewallen, Hudson, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 308 days.

(21) Appl. No.: 14/221,817

(22) Filed: Mar. 21, 2014

(65) Prior Publication Data

US 2015/0268431 A1   Sep. 24, 2015

(51) Int. Cl.
*G02B 6/00* (2006.01)
*G02B 6/38* (2006.01)

(52) U.S. Cl.
CPC ......... *G02B 6/3885* (2013.01); *G02B 6/3823* (2013.01); *G02B 6/3817* (2013.01); *G02B 6/3829* (2013.01); *G02B 6/3839* (2013.01); *G02B 6/3853* (2013.01); *G02B 6/3869* (2013.01); *Y10T 29/49826* (2015.01)

(58) Field of Classification Search
CPC .. G02B 6/444; G02B 6/3869; Y10T 29/49826

USPC .................................................. 385/135–137
See application file for complete search history.

(56) References Cited

U.S. PATENT DOCUMENTS

| 5,109,452 | A |   | 4/1992  | Selvin et al. ................... 385/69 |
|-----------|---|---|---------|------------------------------------------|
| 5,402,515 | A | * | 3/1995  | Vidacovich .......... G02B 6/4455 385/135 |
| 5,471,555 | A | * | 11/1995 | Braga .................. G02B 6/3878 385/114 |
| 5,754,725 | A | * | 5/1998  | Kuder .................. G02B 6/1221 385/143 |
| 5,812,726 | A | * | 9/1998  | Jinnai .................. G02B 6/3636 385/137 |
| 6,009,224 | A | * | 12/1999 | Allen ................... G02B 6/4455 385/135 |

(Continued)

*Primary Examiner* — Thomas A Hollweg
*Assistant Examiner* — Guy Anderson
(74) *Attorney, Agent, or Firm* — Michael E. Carroll, Jr.

(57) ABSTRACT

Embodiments include a fiber organizer comprising an optical interface having a plurality of optical interface-side fiber positions arranged in a linear array, and a cable-side interface having at least two pluralities of cable-side fiber positions each arranged in a linear array. The at least two pluralities of cable-side fiber positions are not collinear with each other, and in some embodiments define a two-dimensional array. A plurality of optical fiber paths extend between the optical interface-side and the cable-side of the fiber organizer such that each optical fiber extends between one of the optical interface-side fiber positions and one of the cable-side fiber positions. Because the transition from a compact bundle of fibers to a linear array occurs within the fiber organizer residing within the plug connector rather than the boot assembly, the boot assembly can be made more compact and ergonomic.

19 Claims, 20 Drawing Sheets

(56) References Cited

U.S. PATENT DOCUMENTS

| | | | | |
|---|---|---|---|---|
| 6,072,932 A * | 6/2000 | Bennett | G02B 6/2551 | 385/139 |
| 6,421,493 B1 * | 7/2002 | Burek | G02B 6/3885 | 385/134 |
| 6,829,425 B2 * | 12/2004 | Barthel | G02B 6/4454 | 385/134 |
| 6,985,665 B2 * | 1/2006 | Baechtle | G02B 6/4472 | 385/134 |
| 7,809,236 B2 * | 10/2010 | Muendel | G02B 6/3636 | 385/136 |
| 7,887,243 B2 * | 2/2011 | Abel | G02B 6/2817 | 385/44 |
| 8,061,904 B1 * | 11/2011 | Greenberg | G02B 6/3853 | 385/139 |
| 8,985,874 B2 * | 3/2015 | Isenhour | G02B 6/42 | 385/88 |
| 2002/0168135 A1 * | 11/2002 | Dautartas | G02B 6/32 | 385/17 |
| 2011/0116746 A1 * | 5/2011 | Chen | G02B 6/32 | 385/74 |
| 2011/0255825 A1 * | 10/2011 | Ko | G02B 6/3817 | 385/15 |
| 2012/0093462 A1 * | 4/2012 | Childers | G02B 6/3831 | 385/33 |
| 2012/0177327 A1 * | 7/2012 | DeMeritt | G02B 6/327 | 385/74 |
| 2012/0189252 A1 * | 7/2012 | Bhagavatula | G02B 6/32 | 385/79 |
| 2012/0195556 A1 | 8/2012 | Wang et al. | | 385/77 |
| 2012/0201499 A1 | 8/2012 | Buijs et al. | | 385/78 |
| 2013/0142489 A1 | 6/2013 | Isenhour et al. | | 685/79 |
| 2013/0266268 A1 * | 10/2013 | Li | G02B 6/3839 | 385/81 |
| 2013/0272666 A1 * | 10/2013 | Qi | G02B 6/38 | 385/93 |
| 2014/0010499 A1 * | 1/2014 | Suematsu | G02B 6/3885 | 385/65 |
| 2014/0093211 A1 * | 4/2014 | McColloch | G02B 6/3636 | 385/74 |
| 2014/0185991 A1 * | 7/2014 | de Jong | G02B 6/32 | 385/79 |
| 2014/0193116 A1 * | 7/2014 | Bylander | G02B 6/4214 | 385/33 |
| 2015/0219863 A1 * | 8/2015 | Haase | G02B 6/3883 | 385/60 |
| 2015/0234126 A1 * | 8/2015 | Haase | G02B 6/389 | 385/59 |
| 2015/0247979 A1 * | 9/2015 | Richmond | G02B 6/38 | 385/83 |

* cited by examiner

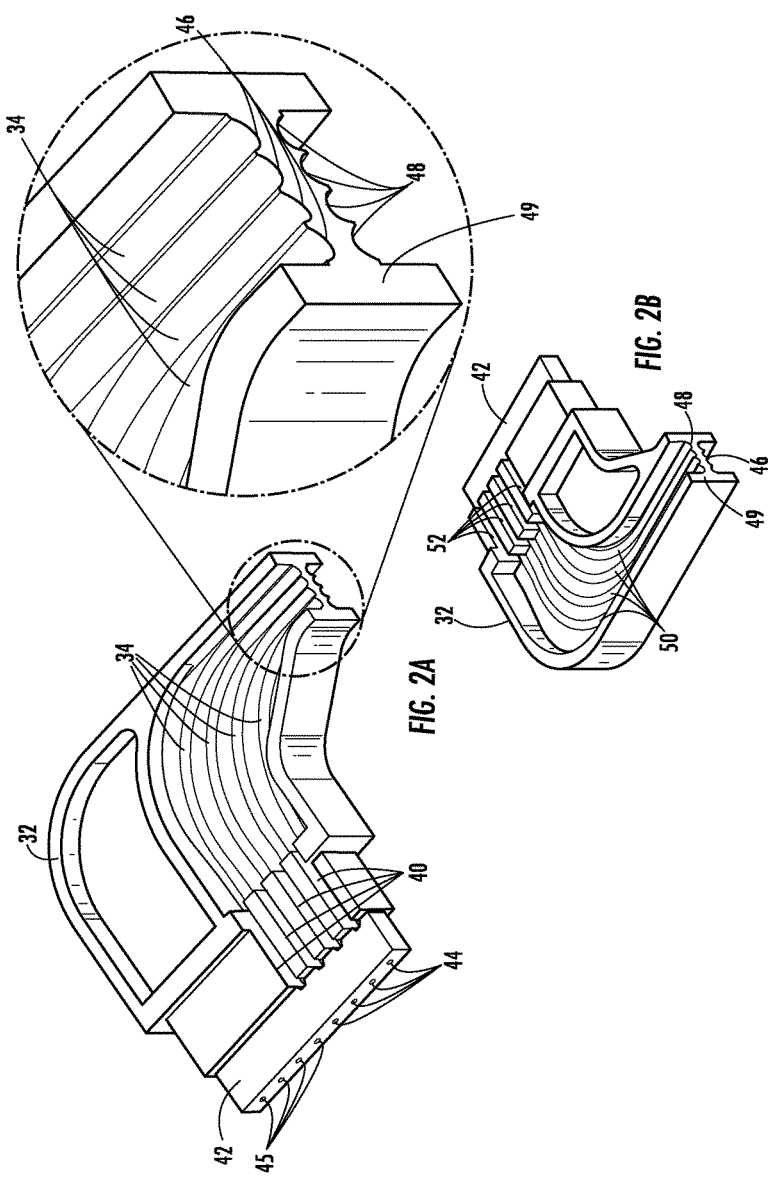

FIBER ORGANIZER FOR RETAINING AND ROUTING OPTICAL FIBERS WITHIN FIBER OPTIC PLUG CONNECTORS, AND RELATED DEVICES, COMPONENTS, AND METHODS

BACKGROUND

The disclosure relates generally to fiber optic connections and more particularly to a fiber organizer that may be used in retaining and routing optical fibers within a fiber optic plug connector.

As electronic devices move toward operation at faster data rates, the electrical interfaces on these devices along with the electrical transmission cables will reach their bandwidth capacity limitations. Additionally, electronic devices are trending toward having smaller and thinner footprints. Optical fibers have displaced copper-based connectivity in much of the traditional long-haul and metro telecommunication networks for numerous reasons, such as large bandwidth capacity, dielectric characteristics, and the like. As consumers require more bandwidth for consumer electronic devices, such as smart phones, laptops, and tablets as examples, optical fibers and optical ports for optical signal transmission are being considered for replacing the conventional copper-based connectivity for these applications. Benefits of optical fiber include extremely wide bandwidth and low noise operation.

In this regard, fiber optic plug connectors and fiber optic receptacle connectors (hereinafter "fiber optic plugs" and "fiber optic receptacles," respectively) can be provided to facilitate optical connections in electronic devices with optical fibers for the transfer of light. For example, optical fibers disposed in a fiber optic plug can be optically connected to a fiber optic receptacle disposed in an electronic device for providing an optical connection to the electronic device. To maintain a good optical connection, the fiber optic plug is designed to have a tight, friction fit within the sidewalls of the fiber optic receptacle when the fiber optic plug is inserted into the fiber optic receptacle to inhibit movement at the optical interface. Thus, the fiber optic plug should be designed to have enough physical strength to receive an applied insertion force to overcome the sidewall resistance of the fiber optic receptacle when the fiber optic plug is inserted into the fiber optic receptacle.

Proper optical alignment of the optical elements within the fiber optic plug and with respect to the receptacle is required to avoid optical signal attenuation. If the optical fibers in a fiber optic plug are not properly aligned with an optical interface such as a ferrule and/or lens element, portions of the optical signals may be lost. Likewise, if the optical interface of the plug is not properly aligned with the fiber optic receptacle, additional attenuation may also occur. Thus, optical alignment throughout the plug and receptacle assemblies is required to maintain a suitable optical signal that is communicated at the optical interface.

SUMMARY

Embodiments discussed herein disclose fiber optic organizers for retaining and routing optical fibers within a fiber optic plug connector. Related devices, components, and methods are also disclosed. In one embodiment, a fiber organizer comprises an optical interface having a plurality of optical interface-side fiber positions arranged in a linear array, and a cable-side interface having at least two pluralities of cable-side fiber positions each arranged in a linear array. The at least two pluralities of cable-side fiber positions are not collinear with each other, and in some embodiments define a two-dimensional array. A plurality of optical fiber paths extend between the optical interface-side and the cable-side of the fiber organizer such that each optical fiber extends between one of the optical-interface side fiber positions and one of the cable-side fiber positions. In some embodiments, optical axes of the plurality of optical interface-side fiber positions are parallel to each other and reside in a first plane, while optical axes of the upper and lower linear array of cable-side fiber positions are parallel to each other and reside in respective second and third planes that are different from each other. In this manner, optical fibers may be routed into the fiber organizer at the cable-side interface from a fiber optic cable in a compact bundle before being spread out and arranged into a linear array at the optical interface-side of the fiber organizer. Because the transition from a compact bundle of fibers to a linear array occurs within the fiber organizer residing within the plug connector rather than the boot assembly, the boot assembly can be made more compact and ergonomic, without sacrificing accurate alignment of the optical fibers with respect to the optical interface and receptacle.

Another embodiment of the disclosure relates to a fiber organizer for a fiber optic connector. The fiber organizer comprises a first interface comprising a plurality of first fiber positions arranged in a first linear array. The fiber organizer further comprises a second interface comprising at least two pluralities of second fiber positions arranged in a plurality of second linear arrays. The first fiber positions are not collinear to at least one of the at least two pluralities of second fiber positions. The fiber organizer further comprises a plurality of optical fiber paths each extending between one of the first fiber positions and one of the second fiber positions, wherein each optical fiber path is configured to guide and retain an optical fiber.

An additional embodiment of the disclosure relates to a fiber optic plug connector. The plug connector comprises a fiber carrier, and a plug optical interface disposed in the fiber carrier. The fiber optic plug connector further comprises a plurality of optical fibers optically connected to the plug optical interface. The fiber optic plug connector further comprises a fiber organizer connected to the fiber carrier. The fiber organizer comprises a first interface having a plurality of first fiber positions arranged in a first linear array. The fiber organizer further comprises a second interface having at least two pluralities of second fiber positions each arranged in a plurality of second linear arrays, wherein the first fiber positions are not collinear to at least one of the at least two pluralities of second fiber positions. The fiber organizer further comprises a plurality of optical fiber paths each extending between one of the first fiber positions and one of the second fiber positions, wherein each optical fiber path guides and retains an optical fiber.

An additional embodiment of the disclosure relates to a method of assembling a fiber optic plug connector. The method comprises disposing a plurality of optical fibers in a plurality of first fiber positions of a fiber organizer arranged in a first linear array. The method further comprises arranging the plurality of optical fibers in a plurality of optical fiber paths each extending between one of the first fiber positions and a second interface. The second interface comprises at least two pluralities of second fiber positions each arranged in a plurality of second linear arrays, wherein the first fiber positions are not collinear to at least one of the at least two pluralities of second fiber positions. The method further comprises connecting the fiber organizer to a plug optical interface disposed in a fiber carrier, thereby optically aligning the plurality of optical fibers with the optical plug optical interface. The method further comprises disposing a cover around the fiber carrier, fiber organizer and plug optical interface.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 2A and 2B are detailed isometric views of the fiber organizer of FIGS. 1B and 1C;

DETAILED DESCRIPTION

Conventional fiber organizers guide and retain fibers between a cable at one end, and an optical interface at an opposite end. The fibers are disposed in the fiber organizer independently of the optical interface so that the entire organizer can be joined to the optical interface in a single action. One drawback of this arrangement is that many conventional fiber organizers route and retain the optical fibers in a common plane. As a result, the optical fibers exit the organizer in a relatively wide and flat configuration at both ends. Fiber optic cables, on the other hand, typically retain a plurality of fibers in a bundle having a compact cross section. Thus, this arrangement requires a relatively large and bulky boot assembly to allow the optical fibers to transition from the compact bundle configuration in the fiber optic cable to the wide and flat configuration as the optical fibers enter the fiber organizer.

In this regard, embodiments discussed herein disclose fiber optic organizers for retaining and routing optical fibers within a fiber optic plug connector. Related devices, components, and methods are also disclosed. In one embodiment, a fiber organizer comprises an optical interface having a plurality of optical interface-side fiber positions arranged in a linear array, and a cable-side interface having at least two pluralities of cable-side fiber positions each arranged in a linear array. The at least two pluralities of cable-side fiber positions are not collinear with each other, and in some embodiments define a two-dimensional array. A plurality of optical fiber paths extend between the optical interface-side and the cable-side of the fiber organizer such that each optical fiber extends between one of the optical-interface side fiber positions and one of the cable-side fiber positions. In some embodiments, optical axes of the plurality of optical interface-side fiber positions are parallel to each other and reside in a first plane, while optical axes of the upper and lower linear array of cable-side fiber positions are parallel to each other and reside in respective second and third planes that are different from each other. In this manner, optical fibers may be routed into the fiber organizer at the cable-side interface from a fiber optic cable in a compact bundle before being spread out and arranged into a linear array at the optical interface-side of the fiber organizer. Because the transition from a compact bundle of fibers to a linear array occurs within the fiber organizer residing within the plug connector rather than the boot assembly, the boot assembly can be made more compact and ergonomic, without sacrificing accurate alignment of the optical fibers with respect to the optical interface and receptacle.

Figure 1A:
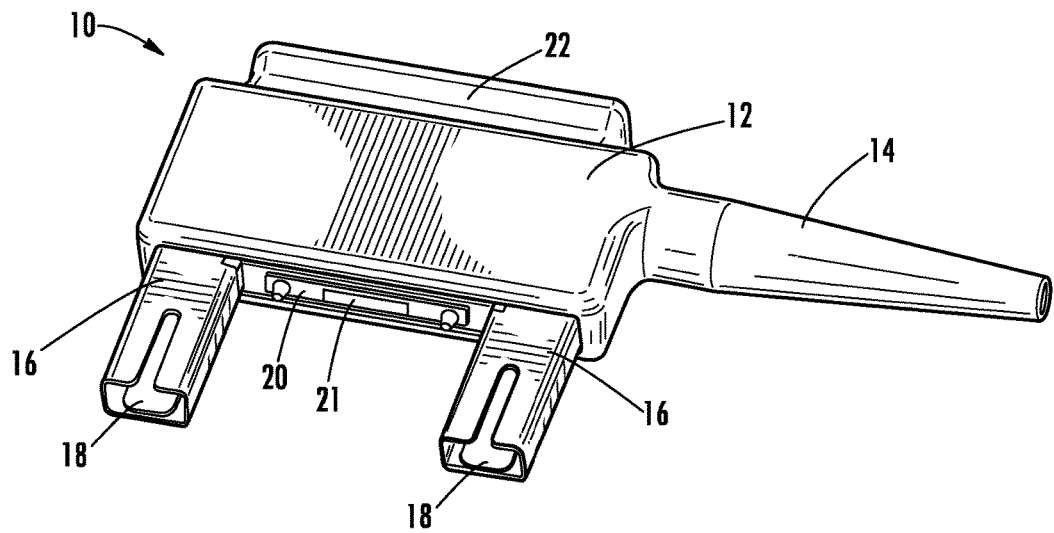
FIGS. 1A-1C are isometric views of a plug connector having a fiber organizer for routing optical fibers between a compact, multi-layered cable-side and a wide, single layered optical interface-side, according to an exemplary embodiment.

Various embodiments will be further clarified by the following examples. In this regard, referring now to FIG. 1A, an exemplary plug assembly 10 is illustrated. Plug assembly 10 includes a plug body 12 optionally connected to a boot 14 configured to receive a plurality of optical fibers (not shown) into the plug assembly 10. The plug assembly 10 optionally has a pair of electrical portions 16 each having one or more electrical contacts 18 configured to electrically communicate with a complementary receptacle. Moreover, electrical portions 16 may provide coarse alignment when mating the plug assembly 10. Plug assembly 10 also comprises a lens body 20 comprising an optical interface 21 for optically communicating with the complementary receptacle. In this embodiment, plug assembly 10 also includes a mechanical grip 22 to aid in manually inserting and removing the plug assembly 10 from a receptacle. One benefit of the configuration of plug assembly 10 is that the boot 14 is relatively compact in comparison with the plug body 12. As a plurality of optical fibers extend into the boot 14 from an optical cable (not shown), the individual optical fibers must be individually routed to specific fiber positions in the lens body 20, comprising an optical interface 21, in order to maintain accurate alignment of the optical fibers within the plug assembly 10. The optical interface 21 may comprise any suitable elements such as integrally formed lenses as a portion of the optical channels, lenses arranged as discrete elements, and/or windows. As will be discussed in greater detail with respect to FIG. 1B, the internal components of plug assembly 10 allow the fibers to be routed into the plug body 12 in a relatively compact bundle, thereby reducing the size of the plug assembly 10.

Figure 1B:
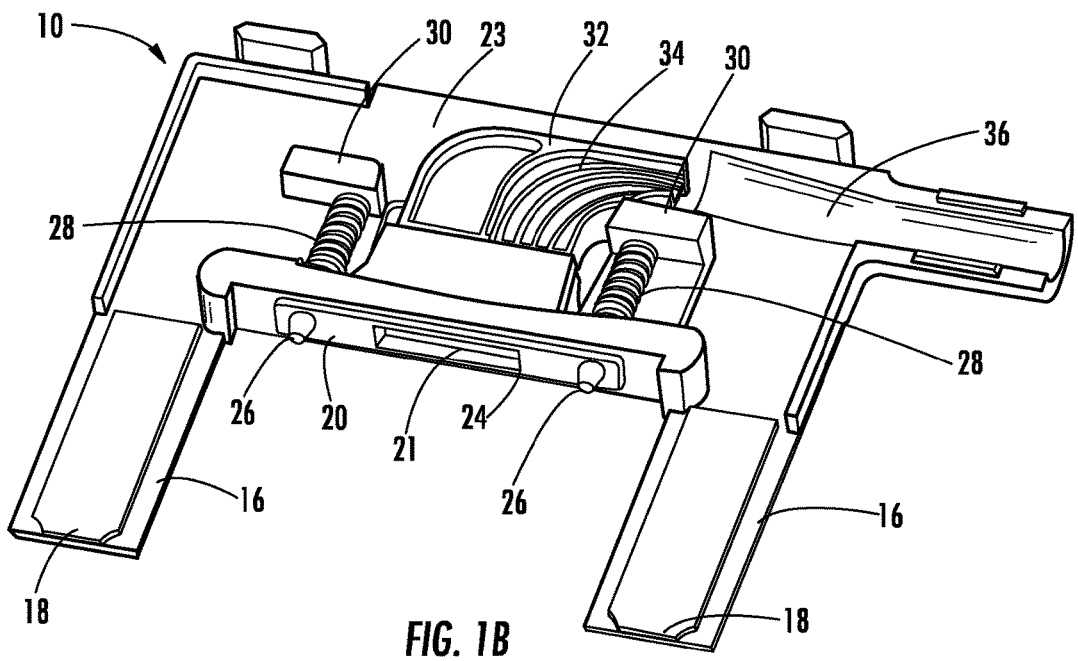

Referring now to FIG. 1B, a subset of the internal components of plug assembly 10 is disclosed. A fiber carrier frame 23, configured to be enclosed by plug body 12, includes electrical contacts 18 and lens body 20. Lens body 20 includes a window 24 and a pair of lens body guides 26 configured to mate with a complimentary receptacle and align the optical channels behind window 24 with complimentary optical elements in the receptacle. The lens body 20 may be movable within the fiber carrier frame 23 to facilitate alignment of the optical channels behind window 24 with the receptacle, and is biased toward a neutral position by a pair of springs 28. Springs 28 are compressed between a portion of the lens body 20 and a pair of stops 30 formed in the fiber carrier frame 23. The plug assembly 10 also includes a fiber organizer 32 for guiding and retaining individual optical fibers into the lens body 20. In FIG. 1B, fiber organizer 32 comprises optical fiber guides 34 as illustrated, which are configured to guide and retain optical fibers from passageway 36 to the lens body 20. As can be seen in FIG. 1B, the optical fiber guides 34 are configured to bundle fibers together at the passageway 36, and spread individual fibers into specific fiber positions for alignment with the optical channels of the optical interface 21.

Figure 1C:
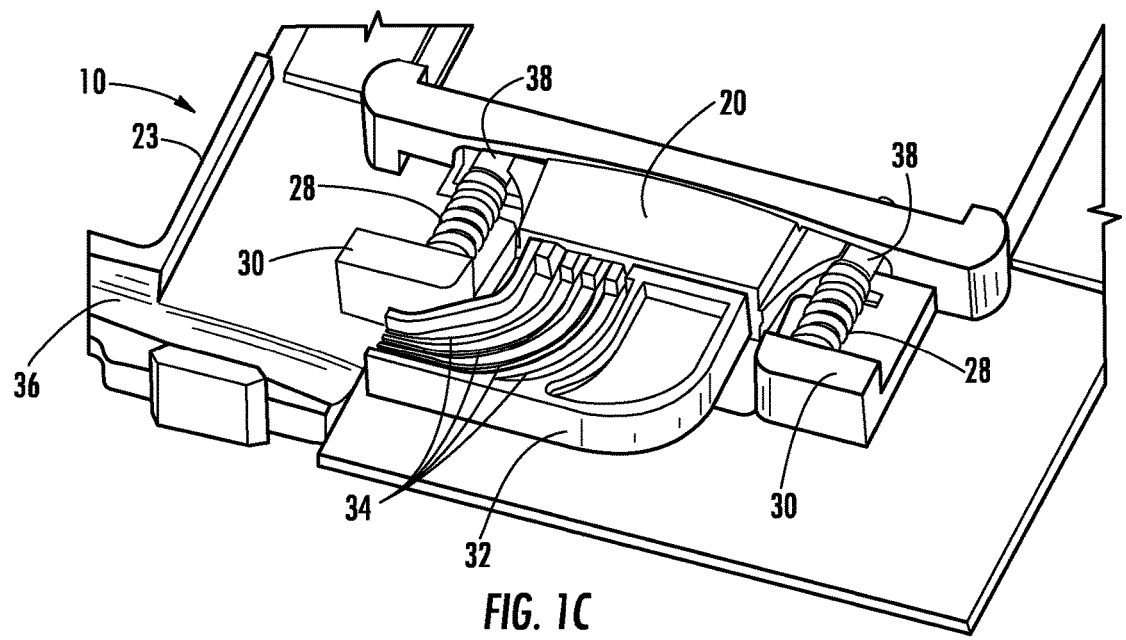

In this regard, FIG. 1C illustrates an alternative view of internal components of plug assembly 10, illustrating the connection between fiber organizer 32 and lens body 20. In this figure, a pair of optical interface pivot joints 38 is also illustrated. These optical interface pivot joints 38 mate with springs 28, thereby providing a greater degree of freedom of movement for the lens body 20 when the plug assembly is plugged into a receptacle. By way of example and not limitation, pivot joints may be ball joints having a round profile for providing force centering during mating.

Turning now to FIGS. 2A and 2B, a detailed view of fiber organizer 32 is illustrated. As will be described in detail below, fiber organizer 32 is configured to receive one or more groups of optical fibers such as two groups of optical fibers at a cable-side interface in a compact bundle from a fiber optic cable. Fiber organizer 32 is further configured to guide the optical fibers into a linear array at a lens body-side of the fiber organizer 32. Because the transition from a compact bundle of fibers to a linear array occurs within the fiber organizer 32 rather than the boot 14, the boot 14 can be made more compact and ergonomic, and the overall size and bulk of the plug assembly 10 may be reduced. Further, the fiber organizer 32 aids in managing the different path lengths of the optical fibers to the lens body-side.

Referring now to FIG. 2A, each optical fiber guide 34 of fiber organizer 32 is configured to guide an individual optical fiber along the upper surface of fiber organizer 32 into a respective upper fiber groove 40, and into a plug lens body interface 42, e.g., a multi-fiber ferrule. The plug lens body interface 42 has a linear array of optical channels such as upper and lower lens body-side fiber positions 44 and 45. These fiber positions may comprise bores for receiving a portion, e.g., an end portion, of an optical fiber. The first portion of the optical fiber may have a different diameter than the second portion. For example, the portion of the optical fiber may comprise stripped, bare glass, and have a diameter smaller than another, unstripped portion of the optical fiber.

Here, each of the upper optical fiber guides 34 is configured to guide a second portion of an optical fiber, e.g., the unstrapped portion discussed above, into a respective upper lens body-side fiber position 44. Referring now to the detail view of the portion of fiber organizer 32 shown in FIG. 2A, the fiber organizer 32 receives optical fibers from the boot 14 (not shown) into passageway 36 and into groups such as linear arrays in different planes. Upper optical fiber guides 34 extend from a linear array of four (4) upper cable-side fiber positions and, as will be described further in greater detail with respect to FIG. 2B, a linear array of lower cable-side fiber positions 48 receive a plurality of optical fibers on a lower side of the fiber organizer 32, to facilitate connection of additional optical fibers to lower lens body-side fiber positions 45. This plurality of arrays of cable-side optical fiber positions 46 and 48 will be referred to collectively herein as the cable-side interface 49. It can be seen from FIG. 2A that the cable-side interface 49 is significantly more compact than the array of lens body-side fiber positions 44 and 45. Thus, the boot assembly 12 (not shown) can also be made more compact, thereby reducing the overall size of the plug assembly 10.

Turning now to FIG. 2B, a view of the bottom side of fiber organizer 32 is illustrated. Similar to upper optical fiber guides 34 of FIG. 2A, fiber organizer 32 also includes a plurality of lower fiber guides 50 extending between lower cable-side fiber positions 48 and extending through lower fiber grooves 52 toward plug lens body interface 42, where the fibers are then retained by plug lens body interface 42 at lower lens body fiber positions 45.

The plug lens body interface 42 in this embodiment has a linear array of N lens body side fiber positions (eight (8) in this example), and the cable-side interface has an upper linear array of N/2 cable-side fiber positions and a lower linear array of N/2 cable-side fiber positions below the upper linear array. However, other numbers and/or arrangements of optical fibers may be used in other fiber organizer configurations according to the concepts disclosed.

As can be seen in FIGS. 2A and 2B, upper and lower lens body-side fiber positions 44 and 45 have optical axes that are parallel to each other and reside in a first plane; however, other arrangements are possible, such as multiple rows. Meanwhile, the upper linear array of cable-side fiber positions have optical axes that reside in a second plane such as in a generally aligned or linear arrangement, while the lower linear array of cable-side fiber positions have optical axes that reside in a third plane different from the second plane and are likewise in a generally aligned or linear arrangement. In this embodiment, the first, second and third planes are generally parallel to each other, with the first plane residing between the second and third planes. Thus, as the upper optical fiber guides 34 extend from the upper cable-side fiber positions 46 to the upper lens body-side fiber positions 44, the optical axis of each fiber shifts down from the second plane to the first plane. Likewise, as lower fiber guides 50 extend from lower cable-side fiber positions 48 to lower fiber lens body-side fiber positions 45, the optical axis of each fiber shifts upwards from the third plane to the first plane. In this manner, the plurality of optical fibers can exit the cable-side fiber positions in a compact or bundled arrangement as the fibers extend into the passageway 36 and into boot 14 (not shown). This in turn permits boot 14 to be relatively compact between the plug assembly 10 and a connected fiber optic cable.

Figure 3A:
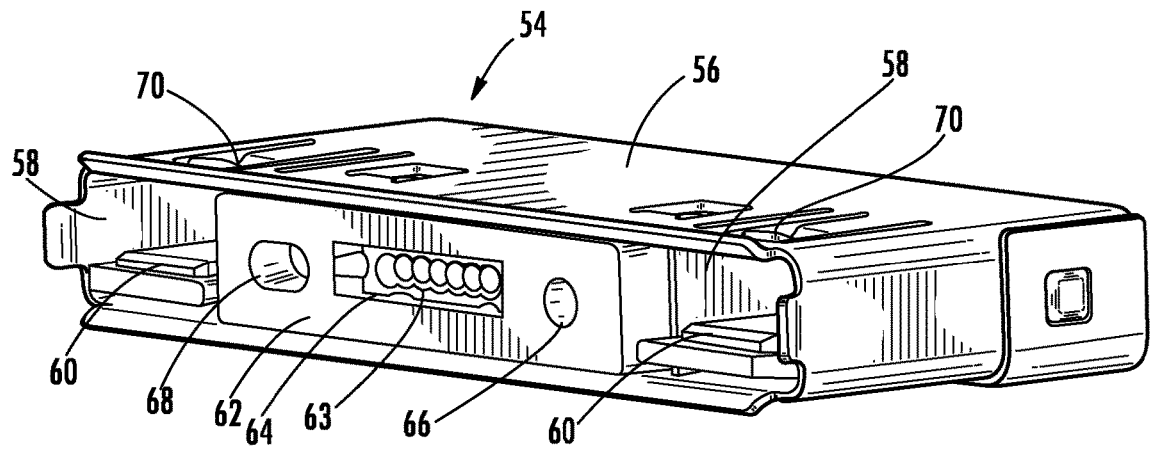
FIGS. 3A and 3B are isometric views of a fiber optic receptacle configured to receive the plug connector of FIGS. 1A-1C, according to an exemplary embodiment.
Figure 3B:
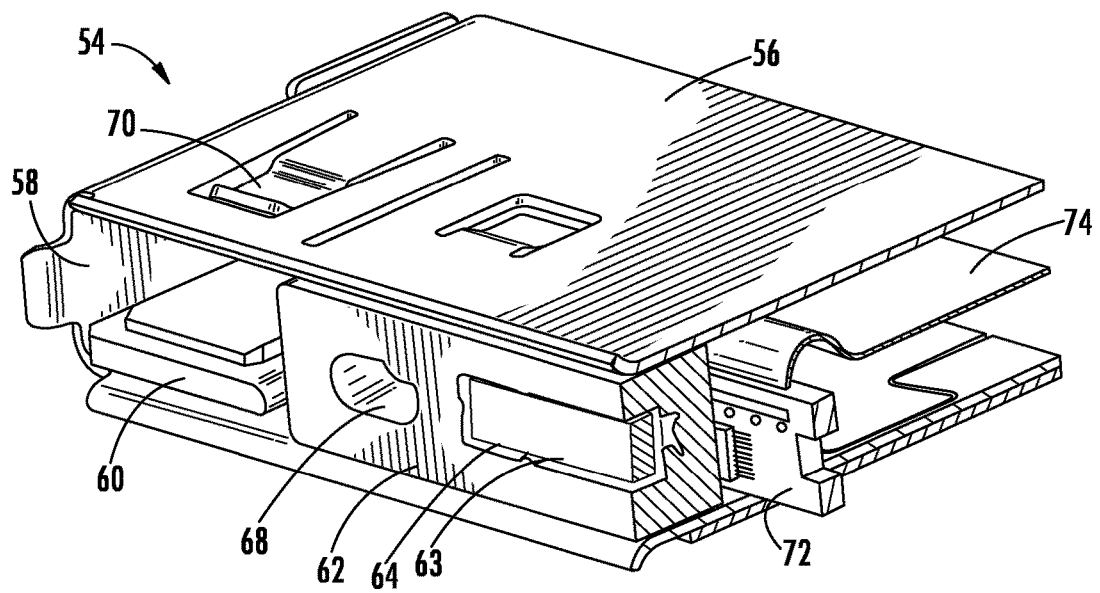

Turning now to FIGS. 3A and 3B, an exemplary fiber optic receptacle 54 is illustrated. Fiber optic receptacle 54 includes a receptacle body 56 having a pair of openings 58. Each opening 58 has one or more electrical contacts 60 matingly receiving electrical portions 16 of plug assembly 10 (not shown). Fiber optic receptacle 54 also includes a receptacle lens body 62 having an optical interface 63 configured to matingly engage optical interface 21 of lens body 20 of the plug assembly 10 for providing optical communication. Window 64 of the receptacle lens body 62 aligns with the window 24 of the plug assembly lens body 20. Alignment of the two optical interfaces 21, 63 is facilitated by guide bores 66, 68, which matingly receive optical interface guides 26 of plug assembly 10. It should be noted that guide bore 68 has a larger horizontal component than guide bore 66, to increase alignment tolerances during insertion of plug assembly 10 into receptacle 54. In this embodiment, the plug assembly 10 is held in place by a friction fit with receptacle 54. In addition, bias elements 70 are configured to press against electrical portions 16 when the electrical portions 16 are inserted in guide bores 58. Referring now to FIG. 3B, a cutaway view of receptacle 54 is illustrated. As can be seen in FIG. 3B, a daughter card 72 is positioned behind window 64 and is configured to convert the received optical signals into electrical signals, which are then provided to ribbon cable 74.

Figure 4A:
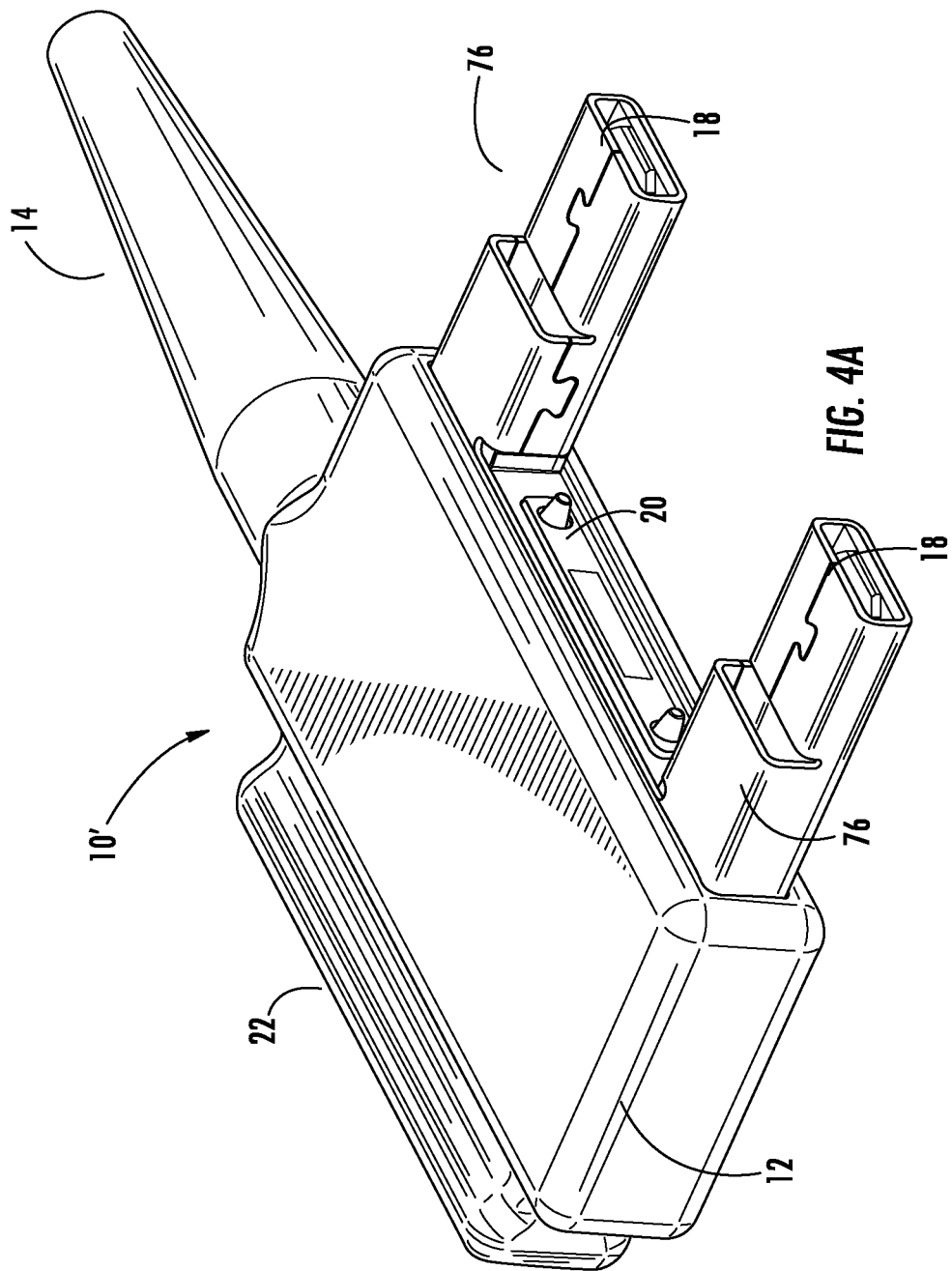
FIGS. 4A and 4B are isometric views of a plug connector, according to an alternative embodiment employing the fiber organizer of FIGS. 2A and 2B.
Figure 4B:
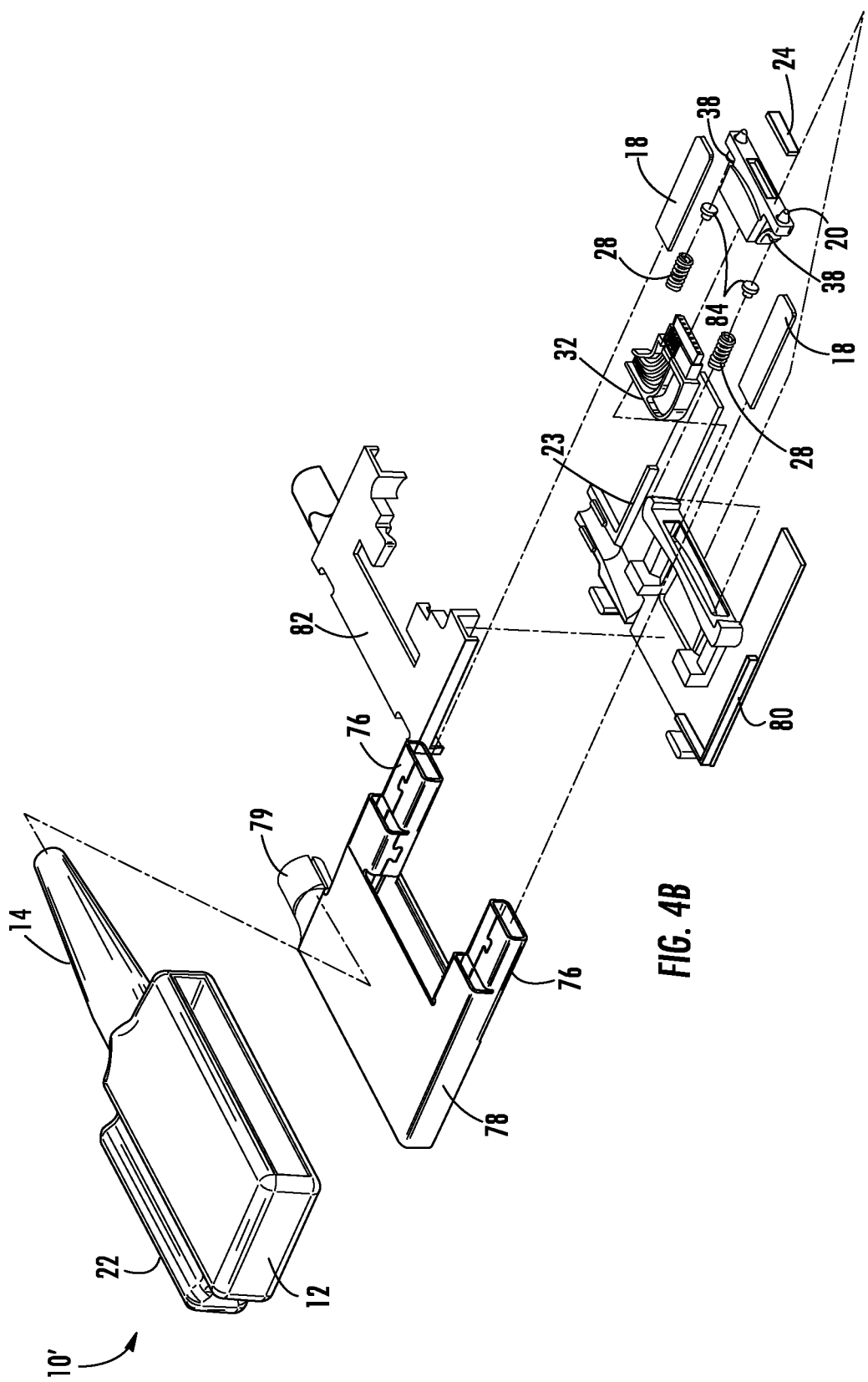

Features of the above described plug assembly 10 are applicable to alternative plug designs as well. In this regard, referring now to FIGS. 4A and 4B, a plug assembly 10' according to an alternative embodiment is illustrated. Plug assembly 10' is similar to plug assembly 10 of FIGS. 1A-1C. However, in this embodiment, plug assembly 10' comprises electrical portion 76 according to an alternate design. It should also be understood that additional alternative electrical portions designs are also possible and the concepts disclosed may even be used with plugs and receptacles that are solely optical. Referring now to FIG. 4B, an exploded view of plug assembly 10' is illustrated. As can be seen by FIG. 4B, plug body 12 encloses a rigid plug frame 78 which includes electrical portions 76 and a boot frame 79, which may include a crimp band or other boot connection mechanism, for mating with and providing rigidity to boot 14. Fiber carrier frame 23 is configured to be disposed inside plug frame 78, and cover 82 is configured to cover and enclose the subcomponents of fiber carrier frame 23, including fiber organizer 32, lens body 20, springs 28, and other components. In this view, it can also be seen that spring seats 84 may be disposed between springs 28 and optical interface pivot joints 38, to provide greater stability and smoothness of adjustment for the lens body 20. Thus, in this manner, individual optical fibers may be retained in alignment with the lens body 20.

Figure 5A:
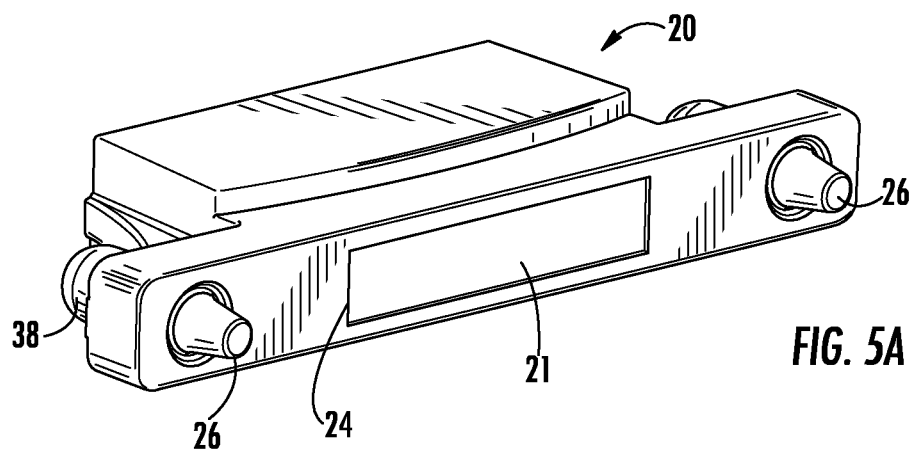
FIGS. 5A and 5B are isometric views of an exemplary lens body for the plug connector of FIGS. 1A-1C, 4A, and 4B.
Figure 5B:
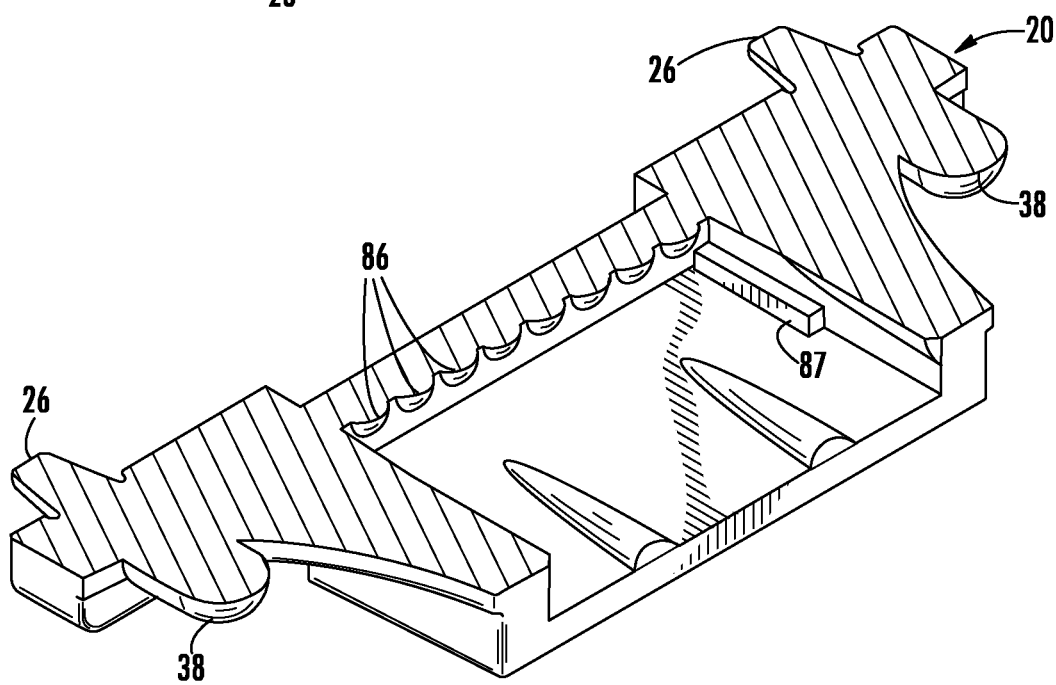

FIGS. 5A and 5B depict detailed views of lens body 20 showing the optical alignment of the fiber organizer 32 in relation to lens body 20. In particular, in FIG. 5B, a horizontal cross section of lens body 20 is illustrated. As can be seen in FIG. 5B, a plurality of lenses 86 are arranged to align with upper and lower lens body-side fiber positions 44 and 45 of fiber organizer 32. In addition, an optical interface guide 87 is also included in the lens body 20 to further aid in aligning fiber organizer 32 with the lens body 20.

Figure 6A:
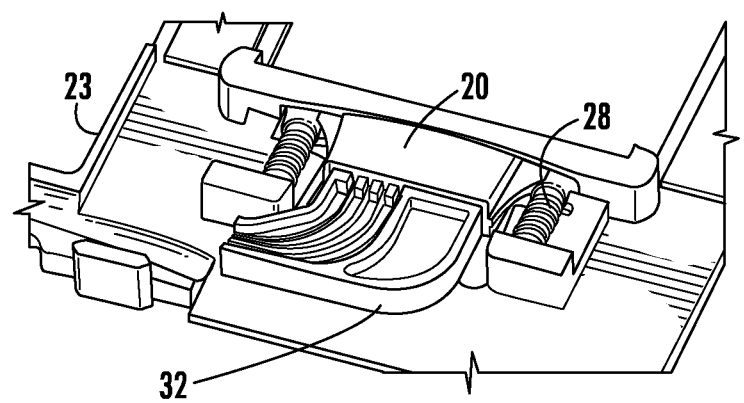
FIGS. 6A-6C illustrate the connection between the lens body of FIGS. 5A and 5B and the fiber organizer of FIGS. 2A and 2B.
Figure 6B:
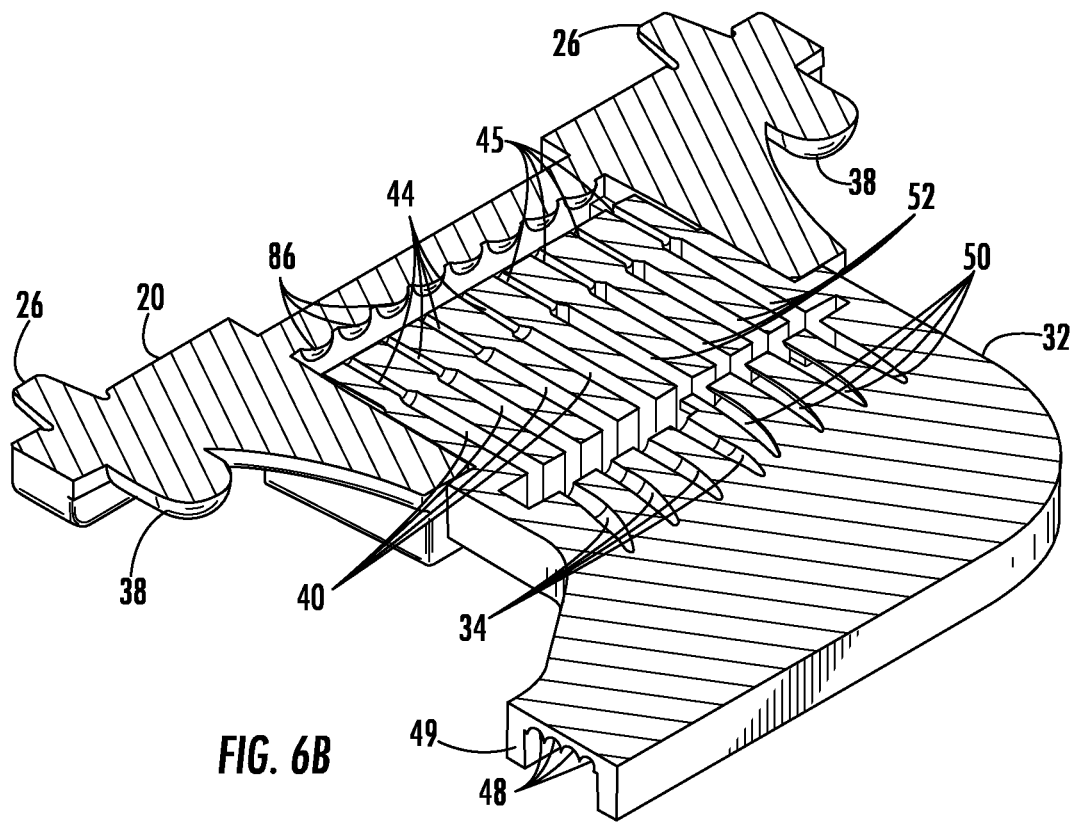

In this regard, FIGS. 6A and 6B illustrate the cooperation between lens body 20 and fiber organizer 32. In particular, FIG. 6B illustrates a horizontal cross section of the fiber organizer 32 disposed in lens body 20. In the view shown by FIG. 6B, the horizontal cross section is approximately along the first plane, which is parallel with the optical axes of upper lens body-side fiber positions 44 and 45. Upper optical fiber guides 34 extend from the second plane above the first plane into upper fiber grooves 40, while lower fiber guides 50 extend from the third plane below the first plane up into lower fiber groove 52, where the fibers are engaged with and retained by lower lens body-side fiber positions 45.

Figure 6C:
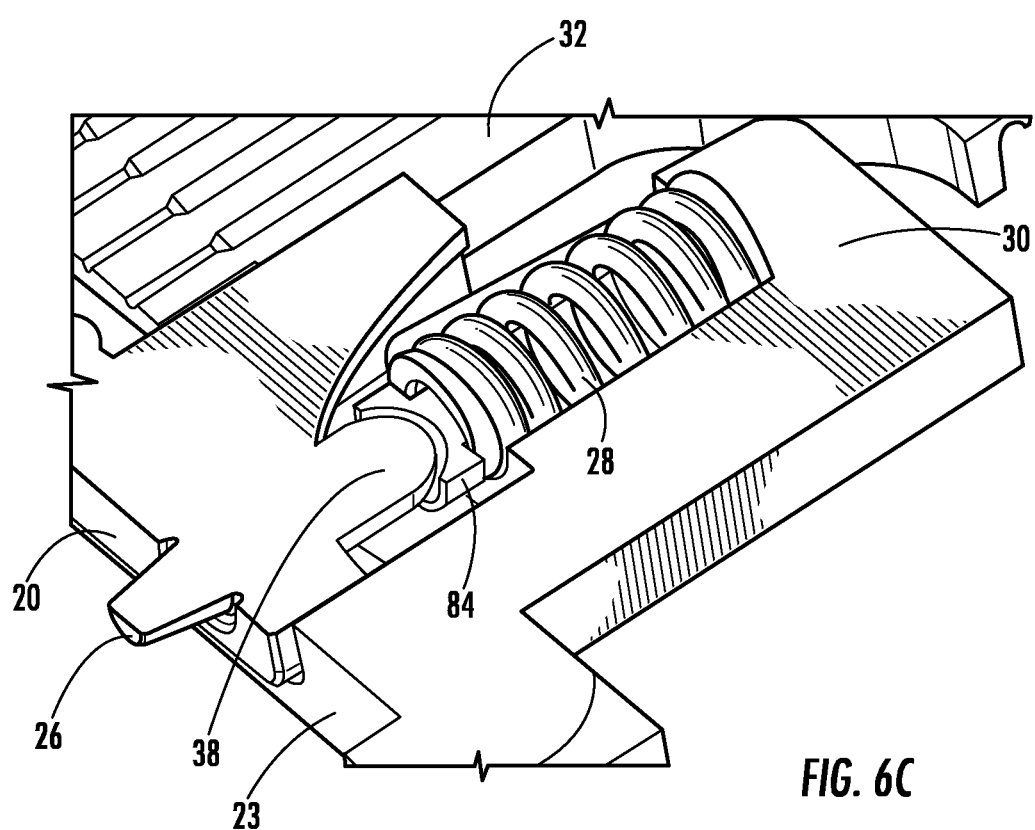

As can be seen by FIG. 6B, lenses 86 are aligned with upper and lower lens body-side fiber positions 44 and 45 (not shown). As shown in FIG. 6C, alignment of lenses 86 with upper and lower lens body-side fiber positions 44 and 45 is facilitated by springs 28, or other resilient elements. Springs 28 are biased between stops 30 of fiber carrier frame 23 and spring seats 84. Spring seats 84 matingly engage with optical interface pivot joints 38 to provide translational and rotational tolerance for aligning the optical interface 21 of lens body 20 with both the fiber organizer 32 and the receptacle 54 when mated, for example.

Figure 7A:
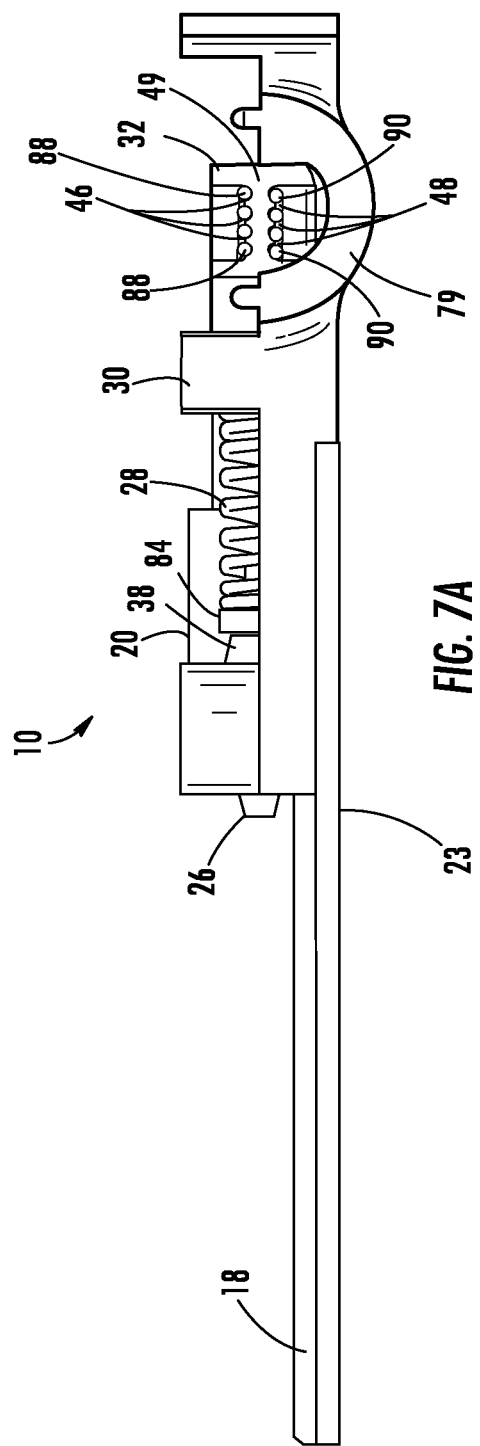
FIGS. 7A-7C illustrate the plug connector FIGS. 4A and 4B with optical fibers disposed therein.
Figure 7B:
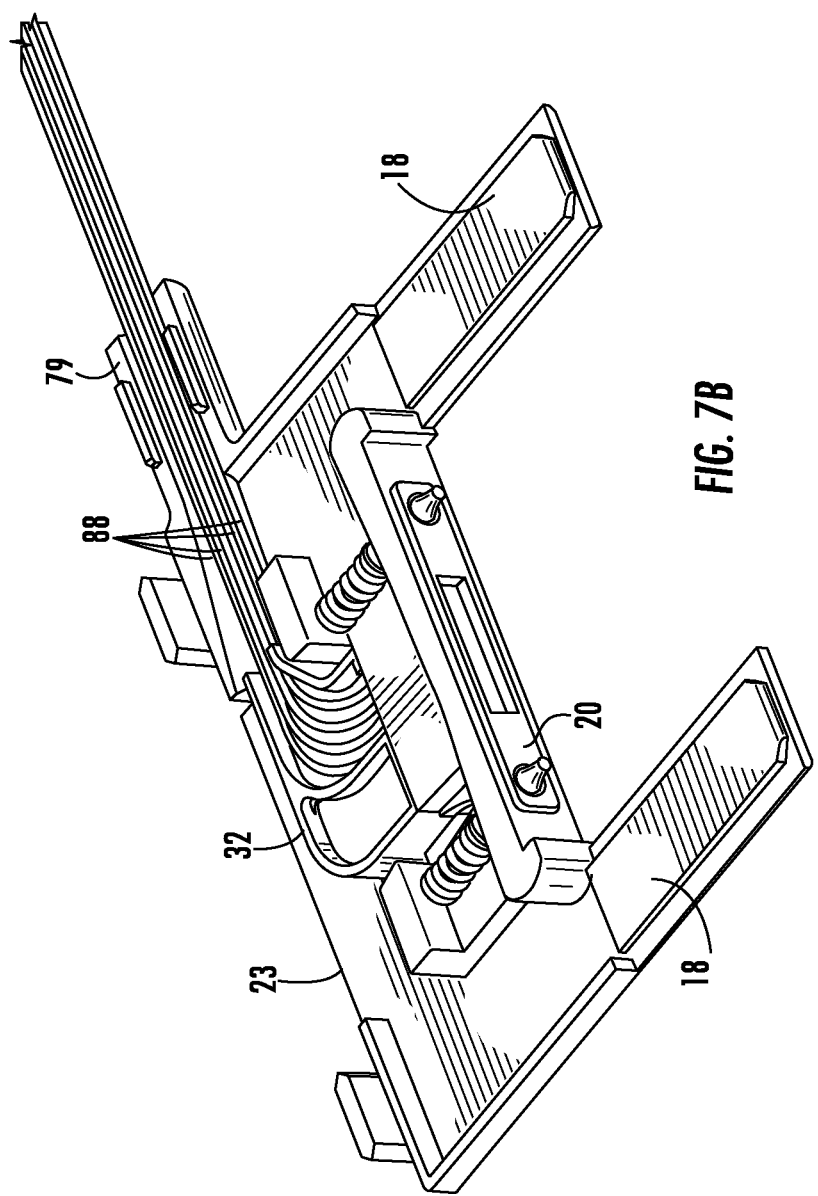
Figure 7C:
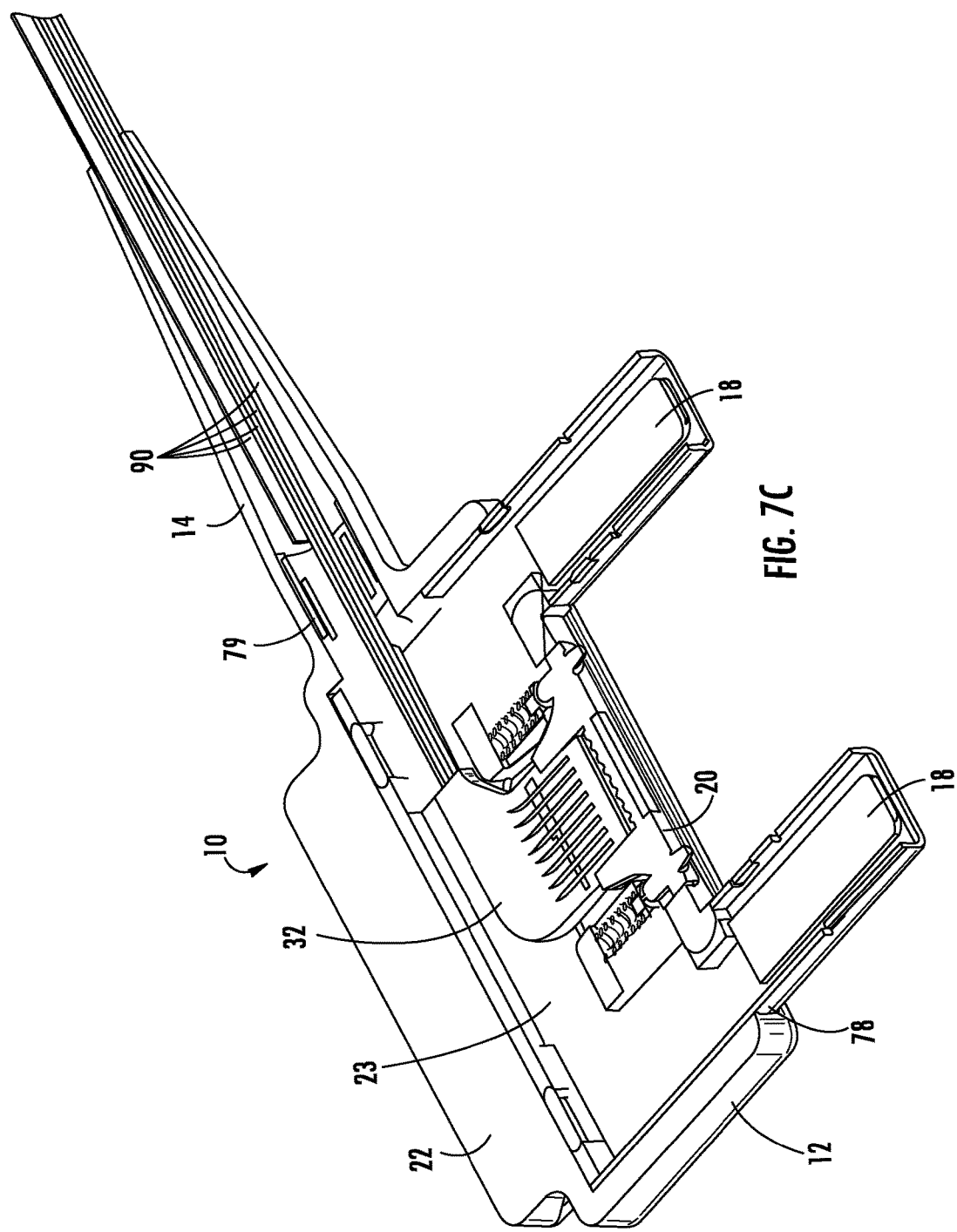

In this manner, a plurality of optical fibers can be distributed from a relatively compact bundle extending from a fiber optic cable through boot 14 and passageway 36 to a linear array of upper lens body-side fiber positions 44 and 45. In this regard, FIGS. 7A through 7C illustrate cutaway views of plug assembly 10 having optical fibers installed therein. In this regard, FIG. 7A illustrates a side cutaway view of plug assembly 10 illustrating the cable-side interface 49 of fiber organizer 32. In this embodiment, four (4) upper optical fibers 88 are disposed in respective upper cable-side fiber positions 46, and four (4) lower optical fibers 90 are likewise disposed at lower cable-side fiber positions 48. In this manner, these eight (8) optical fibers 88 and 90 extend through the boot frame 79 and boot 14 in a relatively compact bundle.

Referring now to FIG. 7B, a view of upper optical fibers 88 extending through boot frame 79, through fiber organizer 32, and into lens body 20 is illustrated. Similarly, FIG. 7C illustrates a horizontal cutaway view plug assembly 10 illustrating lower optical fibers 90 extending through boot 14. The lower optical fibers 90 then extend through boot frame 79 and into the fiber organizer 32, where the lower optical fibers 90 are guided and retained in optical alignment with the optical channels of lens body 20.

Figure 8A:
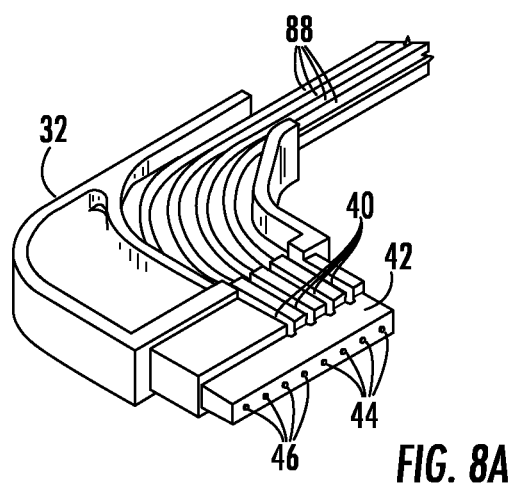
FIGS. 8A and 8B illustrate the fiber organizer of FIGS. 2A and 2B with optical fibers disposed therein.
Figure 8B:
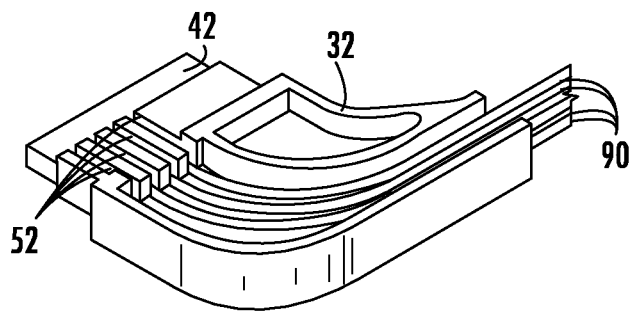
Figure 9A:
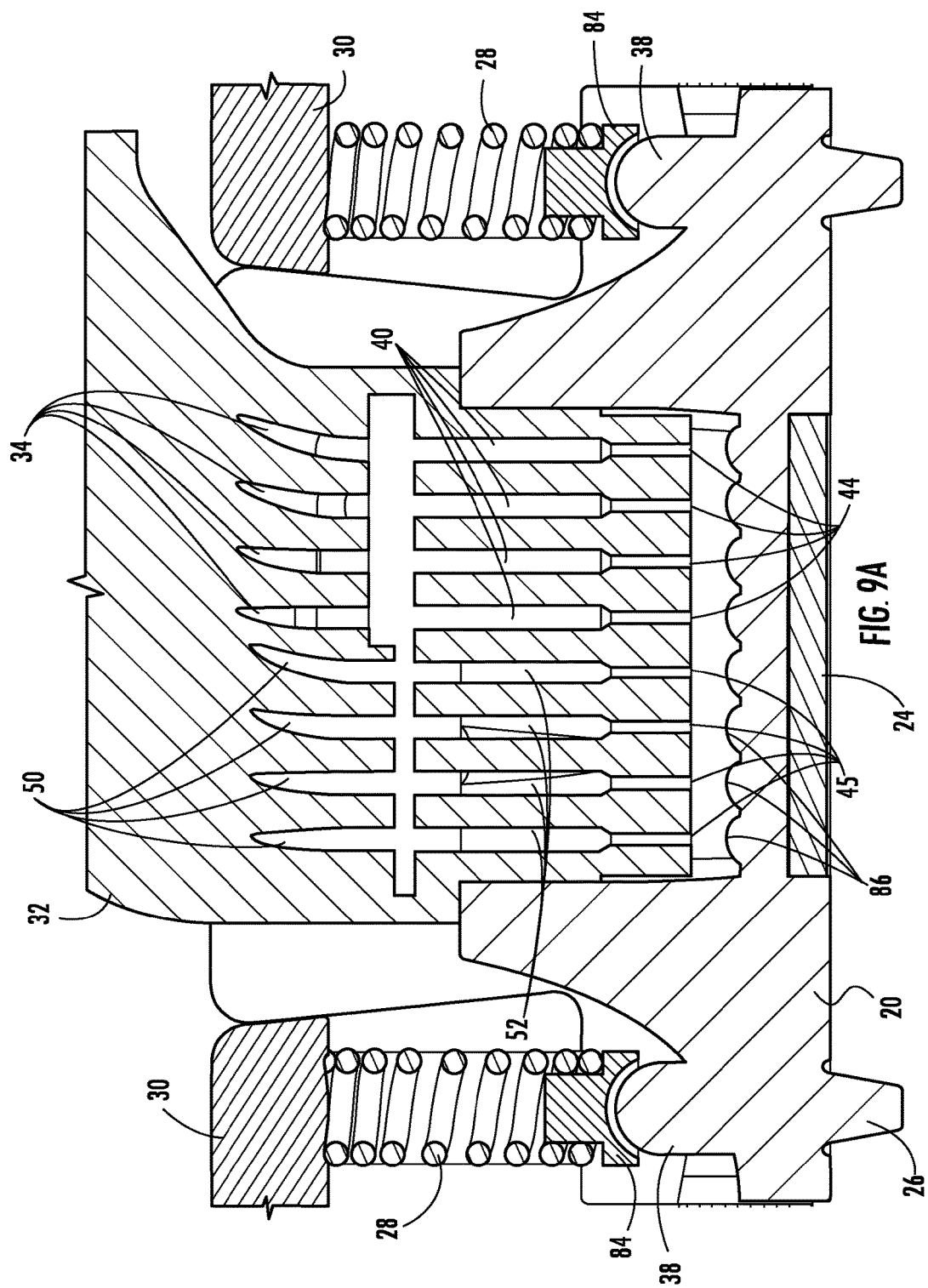
FIGS. 9A and 9B illustrate horizontal cross sections of the fiber organizer of FIGS. 2A and 2B disposed in the optical interface of FIGS. 5A and 5B, including a detailed view of the alignment of the organizer optical interface with the plug optical interface, according to an exemplary embodiment.
Figure 9B:
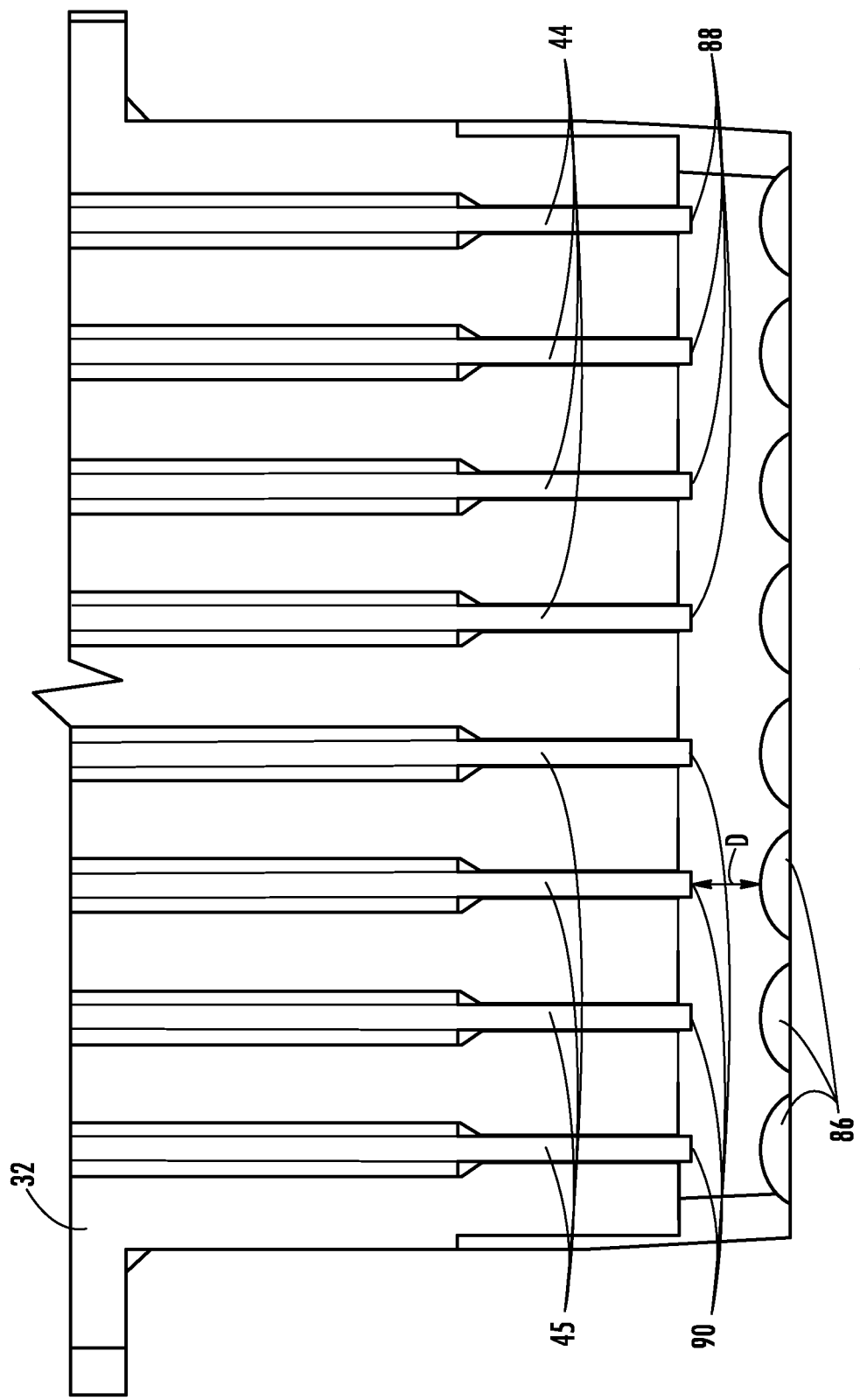

In this regard, FIGS. 8A and 8B illustrate detailed views of fiber organizer 32 with upper optical fibers 88 and lower optical fibers 90 disposed therein. FIG. 9A also illustrates a horizontal cross section of fiber organizer 32 disposed in lens body 20. In FIG. 9A, detailed views of upper optical fiber guides 34, upper fiber grooves 40, lower fiber guides 50, and lower fiber grooves 52 are illustrated. In this manner, all optical fibers entering fiber organizer 32 are arranged and disposed in a single linear array comprising upper and lower lens body-side fiber positions 44, 45. In this manner, end faces of upper and lower optical fibers 88 and 90 may be positioned at or near an optical focal length from lenses 86. In this regard, FIG. 9B illustrates a detailed view of positioning upper and lower optical fibers 88 and 90 at a desired focal distance D from lenses 86.

Turning now to another challenge relating to fiber optic plug connector design, alignment guides aid in aligning a plug connector with a receptacle. However, the number of alignment guides adds to the cost and complexity of both the plug connector and the receptacle. In addition, it is possible for an alignment guide to damage the fiber optic receptacle in situations where excessive force is placed on the plug connector, such as with excessive twisting or bending of the plug connector that may occur in consumer applications such as portable devices.

To address these challenges, a fiber optic plug connector is disclosed herein that includes a pair of tube-shaped guides configured to mate with substantially cylindrical recesses in a receptacle. Each tube-shaped guide has a groove proximate to a junction between the tube-shaped guide and a plug body. These grooves weaken the tube-shaped guides at a specified portion of the tube-shaped guides to facilitate a clean breakaway of the tube-shaped guides in response to excessive stress placed on plug. Consequently, the receptacle and/or device are not damaged if excessive twisting or bending forces are experienced.

Figure 10A:
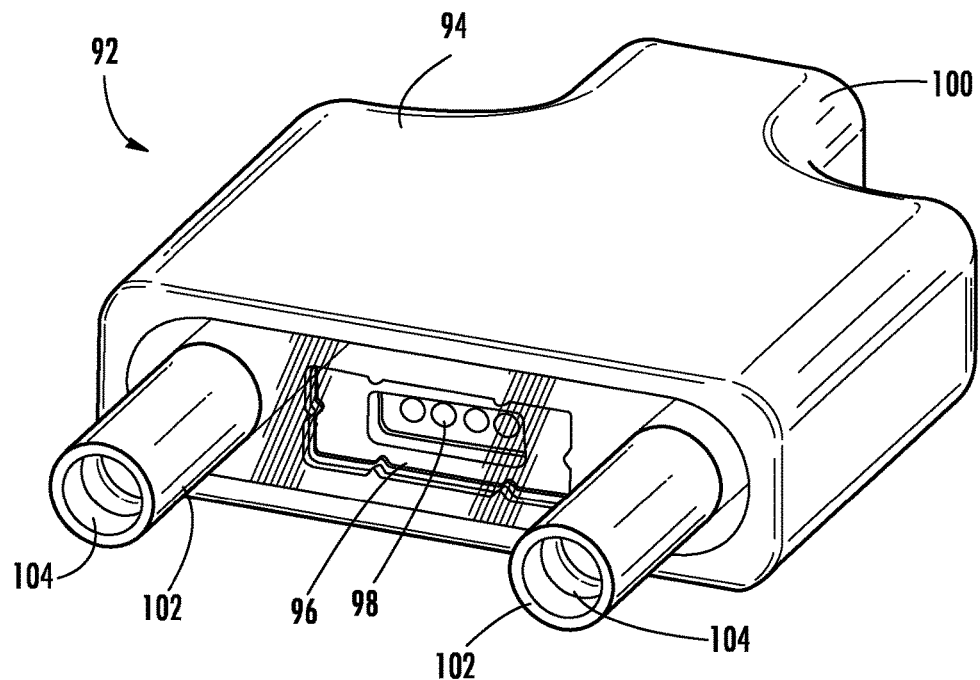
FIGS. 10A-10D illustrate isometric, cross-sectional, and exploded views of internal and external components of a fiber optic plug connector comprising two guide tubes for aligning the plug connector in a receptacle, according to an alternative embodiment.

FIG. 10A illustrates a fiber optic plug assembly 92 according to an alternate embodiment. The fiber optic plug assembly 92 has a plug body 94 comprising a window 96 for facilitating optical communication via an optical assembly 98, such as a multi-fiber ferrule. The fiber optic plug assembly 92 includes a passageway 100, for example a crimp band, for attaching the boot if used and a pair of guide tubes 102, each having a tube opening 104.

Figure 10B:
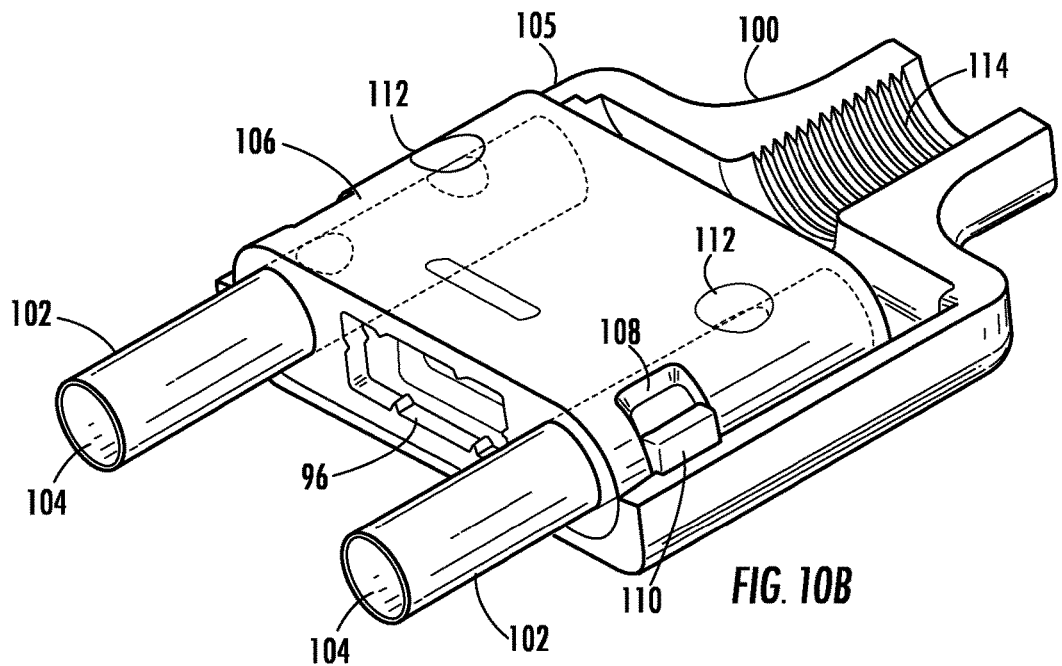

FIG. 10B illustrates a partially disassembled view of fiber optic plug assembly 92. A base portion 105 of plug body 94 carries a plug housing 106 carrying optical assembly 98. The plug housing 106 has a pair of vertical grooves 108 that engage with guide 110 of base portion 105 to secure and retain plug housing 106 in the plug body 94. Plug housing 106 also includes a pair of locking holes 112 for securing and accessing guide tubes 102 in a plug housing 106.

Figure 10C:
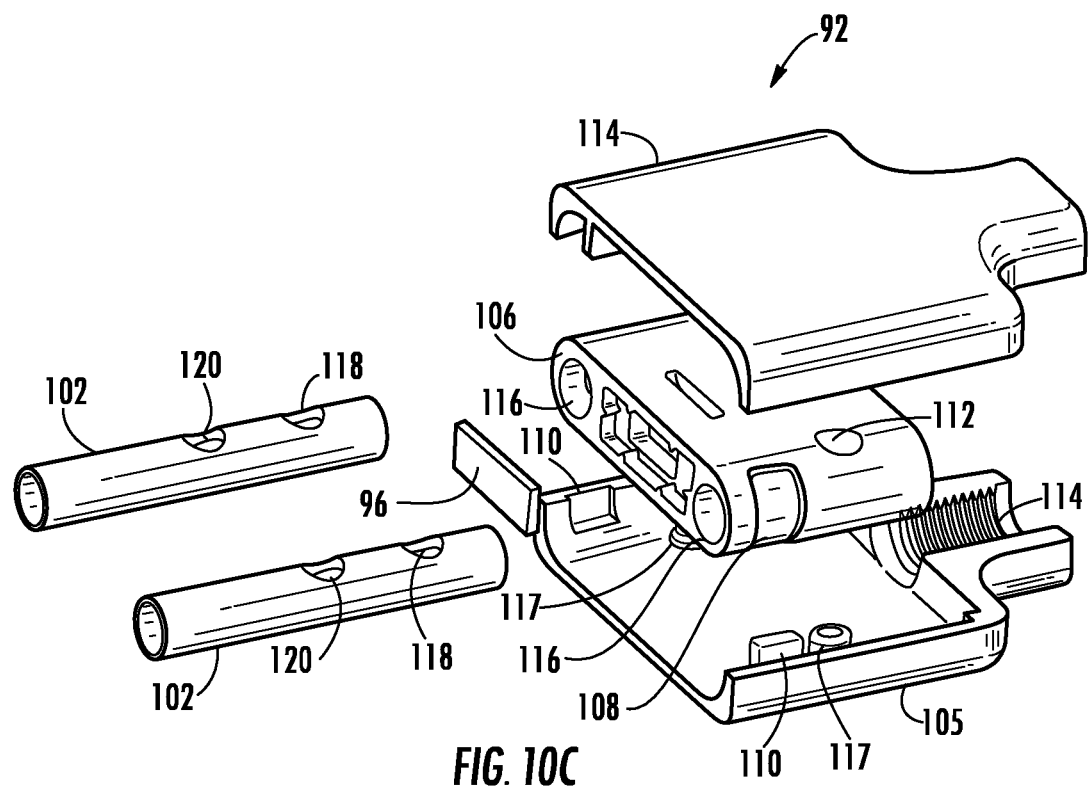

In this regard, referring now to FIG. 10C, an exploded view of fiber optic plug assembly 92 is illustrated. Guide tubes 102 are inserted into guide bores 116 of the plug housing 106. Base portion 105 includes a pair of integrated locking pins 117 that extend through locking hole 118 of each guide tube 102 and locking holes 112 of plug housing 106. Plug cover 114 is then fitted over the plug housing 106 to complete assembly of the fiber optic plug assembly 92. Locking pins 117 add stability and strength by anchoring locking pins 117 to housing 105.

Figure 10D:
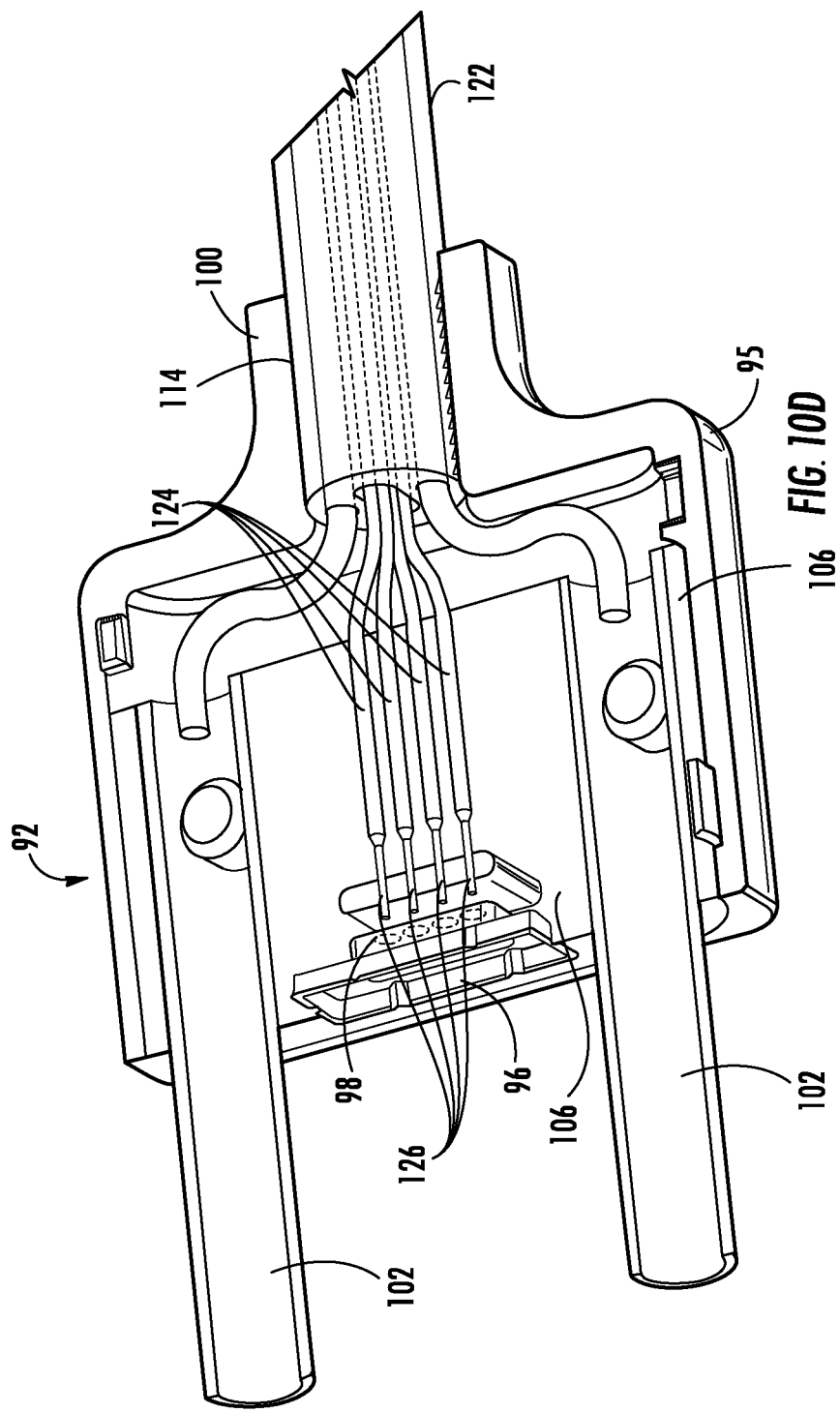
Figure 11A:
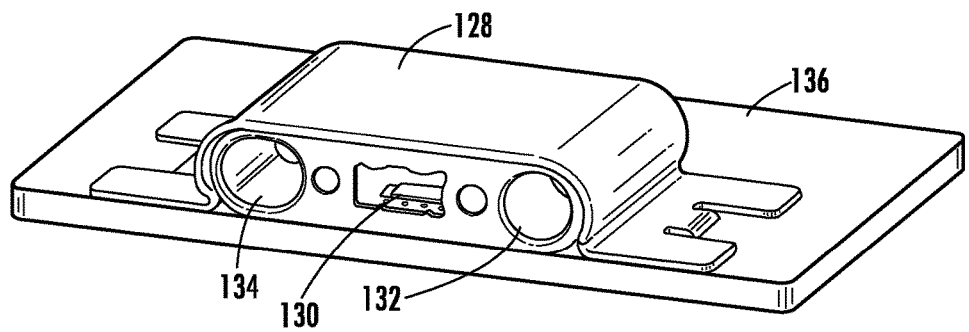
FIGS. 11A and 11B are isometric views of a fiber optic receptacle configured to receive the plug connector of FIG. 10A-10D, according to an exemplary embodiment.
Figure 11B:
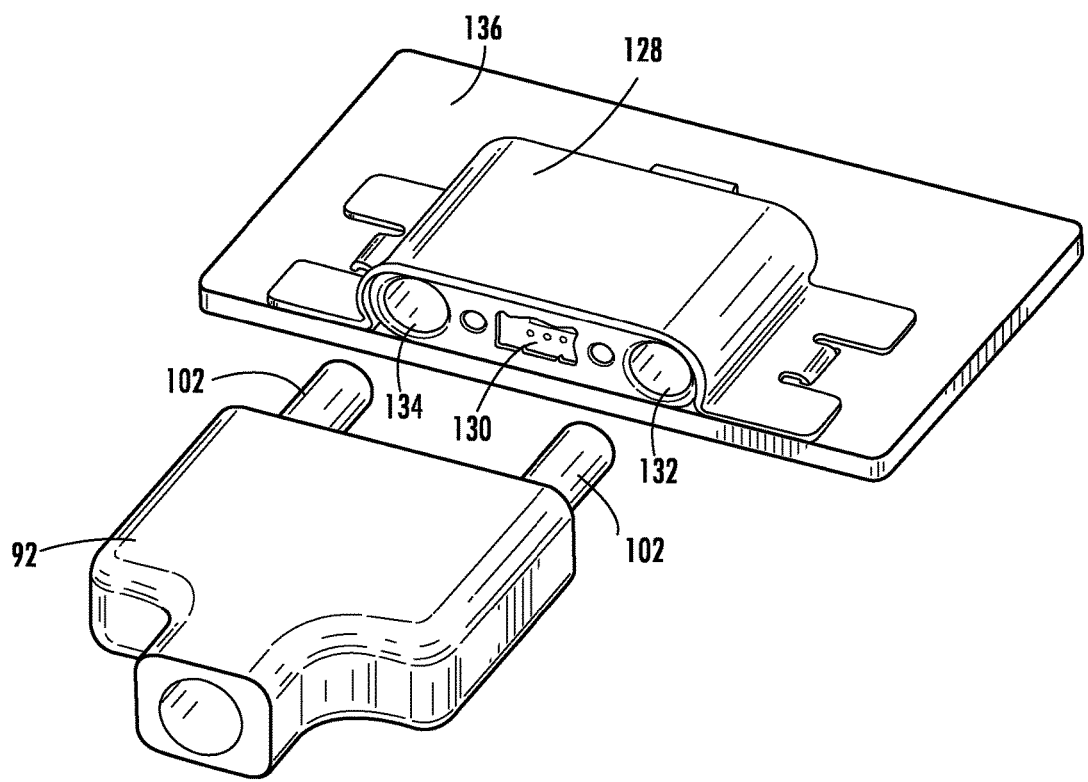

FIG. 10D illustrates a cross sectional view of the internal components of the assembled fiber optic plug assembly 92. A fiber optic cable 122 is disposed in the passageway 100 of the fiber optic plug assembly 92. A plurality of optical fibers 124 extend from the fiber optic cable 122 and are disposed in the optical assembly 98 in a plurality of fiber positions 126. In this manner, a fiber optic plug assembly 92 can be configured to mate with a receptacle using only two (2) guide tubes for alignment of the fiber optic plug assembly 92. FIG. 11A illustrates an exemplary fiber optic receptacle 128 having a lens body 130 and a pair of guide bores 132 and 134. As with the embodiment of FIG. 3 above, guide bore 134 may have a larger horizontal component than guide bore 132 to facilitate alignment of the fiber optic plug assembly 92 with respect to the fiber optic receptacle 128, as illustrated in FIG. 11B. In this embodiment, the fiber optic receptacle 128 is disposed on a substrate 136 or other surface, which may in turn be disposed in a computing or other device.

Figure 12:
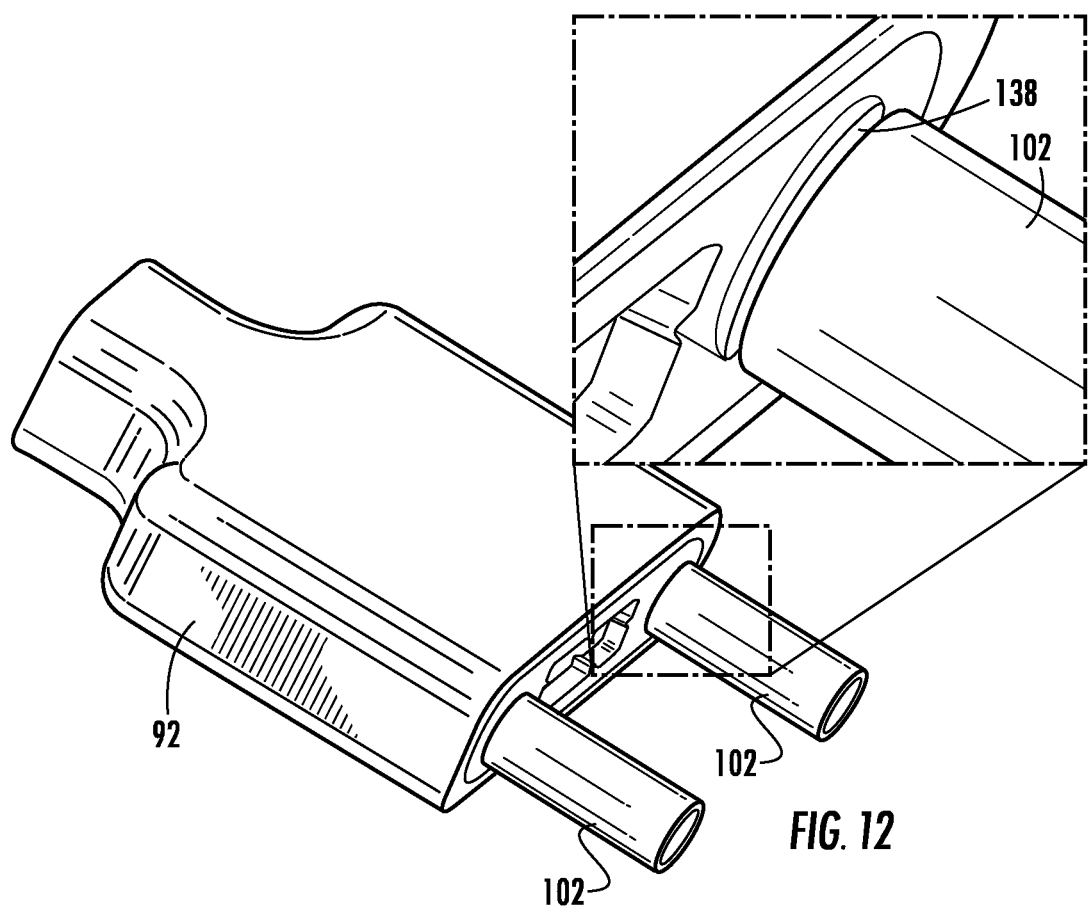
FIG. 12 illustrates a detailed view of grooves in guide tubes of the plug connector of FIGS. 10A-10D configured to permit the plug connector to break away from the receptacle without damaging the receptacle or associated device.

In one embodiment, guide tubes 102 may be configured to include a breakaway feature to avoid damaging the fiber optic receptacle 128 in situations where excessive force such as twisting or bending forces are placed on the fiber optic plug assembly 92. In this regard, FIG. 12 illustrates a detailed view of a guide tube 102 having a breakaway groove 138 at or near the edge of guide bore 116. Because the breakaway groove 138 requires less bending and/or torsional force to break than the rest of the guide tube 102, it is more likely that excessive force placed on the plug body 94 would cause damage to the guide tubes 102 to occur in a controlled manner along the circumference of the breakaway grooves 138 (e.g., grooves provide a weak point at the stress concentration location). In this manner, the danger of damaging the fiber optic receptacle 128 and associated fiber optic device is reduced.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber organizer for a fiber optic connector comprising:
an upper surface and a lower surface;
a plug lens body interface comprising a plurality of upper lens body-side fiber positions and a plurality of lower lens body-side fiber positions arranged in a first linear array;
a cable-side interface comprising a plurality of upper cable-side fiber positions arranged in an upper linear array at the upper surface and a plurality of lower cable-side fiber positions arranged in a lower linear array at the lower surface, wherein the plurality of upper lens body-side fiber positions and the plurality of lower lens body-side fiber positions are not collinear to at least one of the plurality of upper cable-side fiber positions and the plurality of lower cable-side fiber positions; and
a plurality of optical fiber guides disposed on the upper surface and the lower surface, each optical fiber guide extending between an individual one of the plurality of upper lens body-side fiber positions or an individual one of the plurality of lower lens body-side fiber positions, and an individual one of the plurality of upper cable-side fiber positions or an individual one of the plurality of lower cable-side fiber positions, wherein each optical fiber guide is configured to guide and retain an optical fiber.

2. The fiber organizer of claim 1, the plug lens body interface including at least one bore for receiving a first portion of an optical fiber, the bore being located in one of the plurality of upper lens body-side fiber positions or the plurality of lower lens body-side fiber positions.

3. The fiber organizer of claim 1, the cable-side interface being proximate to an optical cable.

4. The fiber organizer of claim 3, the cable-side interface defining at least one channel for receiving a second portion of at least one optical fiber, the at least one channel being located in one of the plurality of upper cable-side fiber positions or the plurality of lower cable-side fiber positions.

5. The fiber organizer of claim 4, wherein the at least one channel comprises at least one pathway for turning a direction of the at least one optical fibers from a first direction at the cable-side interface to a second direction as a linear array of optical fibers at the upper lens body-side fiber positions and the plurality of lower cable-side fiber positions.

6. The fiber organizer of claim 1, wherein the fiber organizer is a multi-fiber ferrule.

7. The fiber organizer of claim 1, wherein the plug lens body interface comprises a linear array of N first fiber positions, the upper linear array has N/2 second fiber positions and the lower linear array has N/2 third fiber positions below the upper linear array, and N is an even number.

8. The fiber organizer of claim 7, wherein N is equal to at least two (2).

9. The fiber organizer of claim 7, wherein N is equal to at least eight (8).

10. The fiber organizer of claim 7, wherein the plurality of upper lens body-side fiber positions and the plurality of lower lens body-side fiber positions define respective axes that are substantially parallel to each other and reside in a first plane.

11. The fiber organizer of claim 10, wherein the upper linear array of the plurality of upper cable-side fiber positions define respective axes that are substantially parallel to each other and reside in a second plane; and
the lower linear array of the plurality of lower cable-side fiber positions define respective axes that are substantially parallel to each other and reside in a third plane different from the second plane.

12. The fiber organizer of claim 11, wherein the second and third planes are not coplanar with the first plane.

13. The fiber organizer of claim 12, wherein the first, second and third planes are substantially parallel to each other, and the first plane resides between the second and third planes.

14. The fiber organizer of claim 1, wherein axes of the plurality of upper lens body-side fiber positions and the plurality of lower lens body-side fiber positions are substantially parallel to each other and define a first plane.

15. The fiber organizer of claim 14, wherein:
the fiber organizer comprises one or more additional cable-side fiber positions arranged in one or more additional arrays; and
each array of cable-side fiber positions defines axes of that are substantially parallel to each other and define a plane such that each plane of cable-side fiber positions is not coplanar with the other planes of cable-side fiber positions.

16. The fiber organizer of claim 15, wherein each plane of cable-side fiber positions is parallel or substantially parallel to the other planes of cable-side fiber positions.

17. The fiber organizer of claim 16, wherein each plane of cable-side fiber positions is parallel or substantially parallel to the first plane.

18. A fiber organizer for a fiber optic connector comprising:
an upper surface and a lower surface;
a plug lens body interface comprising a plurality of upper lens body-side fiber positions and a plurality of lower lens body-side fiber positions arranged in a first linear array, wherein the upper lens body-side fiber positions and the plurality of lower lens body-side fiber positions define respective axes that are substantially parallel to each other and reside in a first plane;
a cable-side interface comprising a plurality of upper cable-side fiber positions arranged in an upper linear array in a second plane proximate the upper surface and a plurality of lower cable-side fiber positions arranged in a lower linear array in a third plane proximate the lower surface, wherein the plurality of upper lens body-side fiber positions and the plurality of lower lens body-side fiber positions are not collinear to at least one of the plurality of upper cable-side fiber positions and the plurality of lower cable-side fiber positions, and the first plane is not co-planar with at least one of the second plane and the third plane; and
a plurality of optical fiber guides each extending between an individual one of the plurality of upper lens body-side fiber positions or an individual one of the plurality of lower lens body-side fiber positions, and an individual one of the plurality of upper cable-side fiber positions or an individual one of the plurality of lower cable-side fiber positions, wherein each optical fiber guide of the plurality of optical fiber guides is configured to guide and retain an optical fiber.

19. A fiber organizer for a fiber optic connector comprising:
an upper surface and a lower surface;
a plug lens body interface comprising a plurality of upper lens body-side fiber positions and a plurality of lower lens body-side fiber positions arranged in a first linear array;
a cable-side interface comprising a plurality of upper cable-side fiber positions arranged in an upper linear array proximate the upper surface and a plurality of lower cable-side fiber positions arranged in a lower linear array proximate the lower surface, wherein the plurality of upper lens body-side fiber positions and the plurality of lower lens body-side fiber positions are not collinear to at least one of the plurality of upper cable-side fiber positions and the plurality of lower cable-side fiber positions; and
a plurality of optical fiber guides each extending between an individual one of the plurality of upper lens body-side fiber positions or an individual one of the plurality of lower lens body-side fiber positions, and an individual one of the plurality of upper cable-side fiber positions or an individual one of the plurality of lower cable-side fiber positions, wherein each optical fiber guide is configured to turn a direction of an optical fiber from a first direction at the plug lens body interface to a second direction at the cable-side interface.

* * * * *